(12) United States Patent
Yoshida (10) Patent No.: US 9,092,973 B2
(45) Date of Patent: *Jul. 28, 2015

(54) BROADCAST CONTROL SYSTEM

(76) Inventor: Kenji Yoshida, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/128,562

(22) PCT Filed: Nov. 16, 2009

(86) PCT No.: PCT/JP2009/006121
§ 371 (c)(1),
(2), (4) Date: Aug. 1, 2011

(87) PCT Pub. No.: WO2010/055689
PCT Pub. Date: May 20, 2010

(65) Prior Publication Data
US 2011/0302621 A1     Dec. 8, 2011

(30) Foreign Application Priority Data

Nov. 14, 2008 (JP) ................................ 2008-292701

(51) Int. Cl.
| | | |
|---|---|---|
| H04N 7/173 | (2011.01) | |
| H04N 5/50 | (2006.01) | |
| G08C 23/04 | (2006.01) | |
| H04N 21/422 | (2011.01) | |
| H04N 21/4223 | (2011.01) | |
| H04N 21/433 | (2011.01) | |
| H04N 21/472 | (2011.01) | |

(52) U.S. Cl.
CPC ............ *G08C 23/04* (2013.01); *H04N 21/4223* (2013.01); *H04N 21/42202* (2013.01); *H04N 21/42204* (2013.01); *H04N 21/4334* (2013.01); *H04N 21/47202* (2013.01); *G08C 2201/30* (2013.01)

(58) Field of Classification Search
USPC ................................................. 348/731–732
See application file for complete search history.

(56) References Cited

U.S. PATENT DOCUMENTS

| | | | |
|---|---|---|---|
| 6,593,908 B1 * | 7/2003 | Borgstrom et al. ........... 345/156 |
| 2002/0030104 A1 | 3/2002 | Matsui et al. | |
| 2006/0159421 A1 | 7/2006 | Sukeda et al. | |
| 2006/0242555 A1 * | 10/2006 | Lapstun et al. ............ 715/501.1 |
| 2009/0091530 A1 | 4/2009 | Yoshida | |

FOREIGN PATENT DOCUMENTS

| | | |
|---|---|---|
| CN | 101005680 A | 7/2007 |
| GB | 2369706 A | 6/2002 |
| JP | 09-215065 A | 8/1997 |
| JP | 2002-149512 A | 5/2002 |
| JP | 2006-324900 A | 11/2006 |
| JP | 2008-154211 A | 7/2008 |

* cited by examiner

*Primary Examiner* — Gigi L Dubasky
(74) *Attorney, Agent, or Firm* — Westerman, Hattori, Daniels & Adrian, LLP (57) ABSTRACT

Provided is a very usable and flexible broadcast control system that can use content that does not present in a set-top box by having a plurality of communication means, and can be easily operated by a user by using a paper controller printed with a dot pattern and a scanner remote controller. The broadcast control system is provided with a dot code reading device which has at least two communication means and optically reads the dot pattern formed on a medium, a first relay device for receiving the communication signal from the first communication means and controlling the broadcast receiver, and a second relay device for receiving the communication signal from the second communication means and transmitting to a server through a network.

10 Claims, 12 Drawing Sheets

USER TABLE

| PEN ID | PERSONAL INFORMATION |
|---|---|
| 0001 | Hanaka Fukui/F/1954.11.11 |
| 0002 | Taro Hayashi/M/1970.6.11 |
| 0003 | Takao Konishi/M/1980.8.10 |
| 0004 | Kayoko Sakai/F/1968.2.4 |

FIG.3 (a)

PRODUCT TABLE

| PRODUCT ID | PRODUCT INFORMATION |
|---|---|
| 1001 | CAKE SET |
| 1002 | FRUIT SET |
| 1003 | JAPANESE CONFECTIONARY SET |
| 1004 | JUICE SET |

| $I_3$ | $I_4$ | $I_5$ |
|---|---|---|
| $I_2$ | $I_1$ | $I_6$ |

| $I_3$ | $I_4$ | $I_5$ |
|---|---|---|
| $I_2$ | $I_1$ | $I_6$ |
| $I_9$ | $I_8$ | $I_7$ |

| $I_5$ | $I_6$ | $I_7$ |
|---|---|---|
| $I_4$ | $I_1$ | $I_8$ |
| $I_3$ | $I_2$ | $I_9$ |
| $I_{12}$ | $I_{11}$ | $I_{10}$ |

| $I_{36}$ | $I_{17}$ | $I_{18}$ | $I_{19}$ | $I_{20}$ | $I_{21}$ |
|---|---|---|---|---|---|
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |

BROADCAST CONTROL SYSTEM

FIELD OF THE INVENTION

The present invention relates to a broadcast control system using a remote control device having a plurality of communication means.

BACKGROUND OF THE INVENTION

Conventionally, remote control devices (remocon) are used to operate instruments, such as televisions, video players, and set-top boxes, for reserving recording of or viewing a television program. However, as the remote controller's menu has a hierarchical structure, there is a problem in which the operation is complicated and requires time for one to get used to. For example, ten times or mote button operations are required to watch a television program, forcing users to bear a tremendous burden.

To solve such a problem, there has been proposed a television program recording system using a digital pen equipped with a pen device as writing material and an infrared reading mechanism and a paper printed with a dot pattern (for example, refer to Japanese Patent Application Publication No. 2006-203381).

In Japanese Patent Application Publication No. 2006-203381, a paper is printed with a dot pattern together with a television program listing. The dot pattern is made by printing unevenly spread small dots and indicates absolute position information in a wide plane area. If a user encircles the television program listing or ticks a check box beside the television program listing using a digital pen, the digital pen recognizes the position information of that position. As the position information on the paper is associated with the program information in advance, the encircled or ticked program is reserved for recording. In this way, as operations, such as reserving of recording a television program, can be performed on a paper medium, even a user who is not familiar to machine operations can perform operations easily, intuitively, and flexibly. In addition, a paper medium has an advantage as being superior in displaying a comprehensive view and portability.

SUMMARY OF THE INVENTION

Problems that the Invention is to Solve

However, in the system of Japanese Patent Application Publication No. 2006-203381, as the television program listing is written in by the digital pen, there is a problem in which the visual quality of the paper is degraded. For this reason, repeated use thereof is difficult and a new paper printed with the dot pattern should be prepared each time for use, lacking economical efficiency.

Moreover, there are increasing chances recently of reserving recording of or viewing a variety of television programs, such as satellite broadcast and cable television programs using a set-top box, in addition to normal terrestrial programs. Although the conventional set-top box can be connected to the Internet, it was not open for interactive operation using the Internet connection. In other words, the remote controller cannot directly connects to a server, and always has to be mediated by a set-top box. For this reason, if a user selects a content that does not exist in the programs of the set-top box (e.g., a television program, shopping), the content cannot be used, causing inconvenience to the user.

The invention was devised in consideration of such problems, and has a technical subject to provide a broadcast control system with convenience and flexibility, in which a user can use even a content that does not exist in a set-top box by having a plurality of communication means, and, further, a user can easily perform operations using a paper controller printed with a dot pattern and a scanner remote controller.

Means to Solve the Problems

The broadcast control system of the invention comprises: a dot code reading device comprising at least two or more communication means; a first relay device that receives a communication signal from first communication means of the communication means and controls a broadcast receiver; and a second relay device that receives a communication signal from second communication means of the communication means and transmits to a server connected over a network, and the dot code reading device comprises: a reading element that optically reads out a dot pattern formed on a medium; and, code conversion means that converts the dot pattern read out by the reading element to a code, wherein the dot code reading device comprises: a table that relates the code to a command; the first and second transmission means that output a command signal converted from the command or a read code signal; and transmission control means that selectively transmits the command signal or the code signal from the first transmission means or the second transmission means based on the table.

Communication with the first relay device, that is, communication between the set-top box and the scanner remote controller is carried out using infrared communication which frequency range is 3 GHz-30 GHz.

Communication with the second relay device, that is, communication with the network terminal, can be carried out using so-called ZigBee that uses 2.4 GHz in IEEE805.15.4 as the physical layer interface.

In this way, communication between the scanner remote controller and the set-top box and communication between the scanner remote controller and the network terminal can be carried out without interfering each other by differentiating the communication methods.

However, it is no problem to use the same communication method. For example, infrared communication may be used for both communication between the scanner remote controller and the set-top box and communication between the scanner remote controller and the network terminal. In such a case, a unique code of the destination hardware may be added as header information before transmission to prevent false recognition of the set-top box or the network terminal.

(2) In the broadcast control system of the invention, if a command corresponding to the read code exists in the table, the transmission control means causes the first transmission means to output the corresponding command to the first relay device, and, if a command corresponding to the read code does not exist in the table, causes the second transmission means to output the code as is to the second relay device According to this, as even a content that does not exist in the set-top box can be delivered over a network, the existing set-top box can be utilized as is even when a user wants to use a new content.

(3) In the broadcast control system of the invention, the first relay device is a broadcast receiving set-top box for controlling receiving of broadcast signals, the second relay device is a network terminal connected to a network, receiving a code signal or a command signal output from the second transmission means and transmitting to the server connected through the network, and the broadcast receiving set-top box as the first relay device receives a broadcast signal generated based on the code signal or command signal received by the server and outputs video information converted from the broadcast signal to a display device connected to the set-top box.

(4) In the broadcast control system of the invention, the code includes a coordinate value.

According to this, the dot pattern can register XY coordinates as well as a code value. In this way, information can be transmitted and delivered in relation to a position; for example, a map video can be delivered, or a paper controller can be used as a tablet.

(5) In the broadcast control system of the invention, the dot pattern is converted to a unique coordinate value, instead of the code.

According to this, each medium has unique XY coordinate values. Commands can be transmitted to the first or second relay device by providing a table that relates the coordinate values to the commands in the dot code reading device.

(6) In the broadcast control system of the invention, the second relay device, that is, the network terminal device, is a mobile telephone terminal.

Recently, mobile telephone terminals can perform a variety of functions, such as viewing a television program, delivering a video, shopping using osaihu-keitai (trademark of NTT DOCOMO, INC.) in addition to telephone and mail. According to this invention, as such a mobile telephone terminal is used as the second relay device, a network terminal is not required to be prepared any more and the user can use the system more easily. In addition, the user can use the system even away from home. As the result, a highly convenient system can be provided.

(7) In the broadcast control system of the invention, the mobile telephone terminal transmits a read code obtained by reading a dot pattern formed on a medium of a catalog using the dot code reading device together with an identification code of the mobile telephone terminal to a server.

According to this, a server can easily recognize which mobile telephone terminal transmitted the read code.

(8) In the broadcast control system of the invention, the server executes a process based on the read code in relation to a mobile telephone terminal identified by the identification code as well as informs the process result to a settlement server.

(9) In the broadcast control system of the invention, the process is download delivery of a content specified by the read code.

(10) In the broadcast control system of the invention, the process is purchase of a product or provision of a service specified by the read code.

According to this, a variety of services using the mobile telephone can be provided to the user.

(11) In the broadcast control system of the invention, the dot code reading device is a remote controller.

According to this, a set-top box or the like can be operated simply by reading a dot pattern on a medium, realizing easy operation and enhanced convenience to the user.

Advantageous Effect of the Invention

According to the invention, a content of which program does not exist in a set-top box can be delivered via a network terminal, enabling a user to use a new program without a need to buy a new set-top box. In this way, a system superior in convenience and economical efficiency can be provided.

Further, as a desired process can be performed simply by touching a medium printed with a dot pattern using a dot pattern reading device, a user does not need to repeatedly press buttons to get to the desired process. Thus, it is possible to provide a system significantly superior in convenience and simplicity.

BRIEF DESCRIPTION OF THE DRAWINGS

FIGS. 8A to 8C are examples of information dot of GRID1 and bit expression defined thereby.

FIGS. 9A to 9D show variants of dot pattern of GRID1.

DESCRIPTION OF REFERENCE NUMERALS AND SIGNS

1 DOT PATTERN
2 KEY DOT
3 INFORMATION DOT
4 REFERENCE GRID POINT DOT
5 VIRTUAL GRID POINT
48*a*, 48*b*, 48*c*, 48*d*, 48*e* REFERENCE DOT
48*f*, 48*g*, 48*h* VIRTUAL REFERENCE POINT

DETAILED DESCRIPTION OF THE INVENTION

Figure 1:
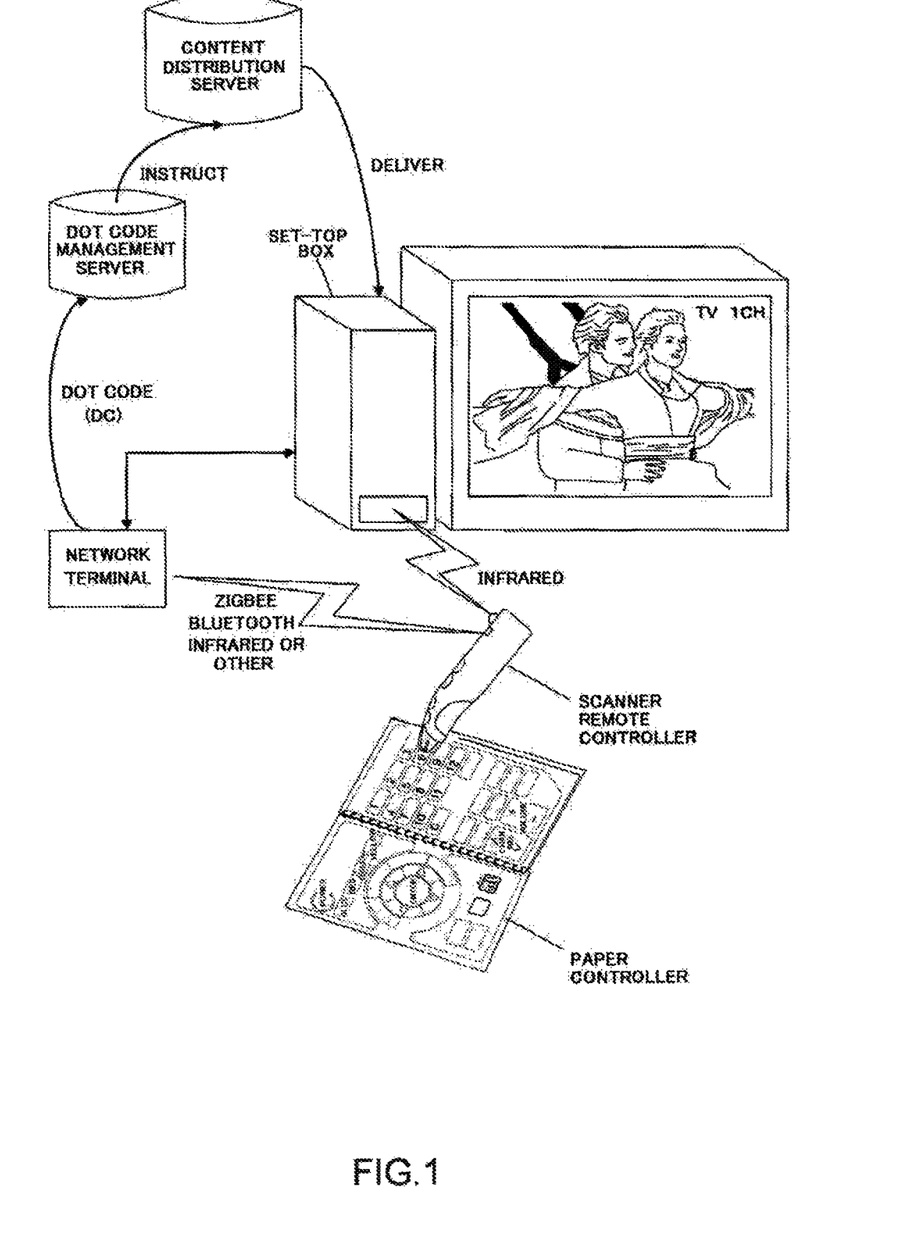
FIG. 1 is an explanatory diagram showing the overview of the broadcast control system of the invention.

FIG. 1 is an explanatory diagram of the overview of the broadcast control system of the invention.

The present system comprises: a scanner remote controller as a dot code reading device, paper controller, set-top box, and network terminal.

The paper controller is of a booklet shape in which one long side is bound by rings, and each page of the booklet is printed with a drawing pattern of operation buttons. That is, there are provided a plurality of image regions of rectangles with rounded corners, circles, and squares, printed with numbers, symbols, and words made of a plurality of letters and characters (e.g., "Select Previous Channel," "Input CH Number," "Enter") that resemble operation buttons of a remote controller for television or set-top box.

The infrared code corresponding to each number and plurality of letters and characters is registered as a dot pattern that is described later in each image region.

In addition to one or a plurality of sheets of mediums printed with images, letters, characters, and symbols that symbolize operations of controlled devices as graphical data as shown in FIG. 1, the paper controller may come in any form including a television program listing of a booklet form, picture book, magazine, and mail-order catalog.

The scanner remote controller incorporates a sensor unit at the leading end of the device main body (at the lower end in FIG. 1). Four push buttons are provided on the side of the main body; enter button, retransmission button, + (volume UP) button, and − (volume DOWN) button are provided in the order from the closest to the leading end (refer to FIG. 13). Further, a ZigBee communication unit (if communicating with other means, a communication unit of that means) and an infrared communication unit are provided on further bottom side of the push buttons (refer to FIG. 13).

The set-top box is a collective name of instruments that connect with a television receiver to enable receiving of a variety of services. Also, the set-top box is a device that receives broadcast signals, such as cable television broadcast, satellite broadcast, terrestrial television broadcast (digital broadcast, analog broadcast), and IP broadcast (broadband VOD (Video On Demand), etc.), converts them into signals that can be viewed, and displays them.

The network terminal is a terminal device for connecting to a network, such as an adapter and a cradle.

This network terminal provides Internet connection to a cable television or comprises a network connecting function by optical cables, ADSL, or a wireless method.

The present system can be used for operating a set-top box, television, and the like. A user (operator) clicks (captures) the image region of a paper controller using a scanner remote controller. Then, the CPU of the scanner remote controller converts the dot pattern printed on the clicked image region into a dot code according to the program, refers to a table registered in FM (flash memory), and determines whether a command corresponding to the dot code exists. If the command corresponding to the dot code exists, the command is transmitted to the receiving unit of the set-top box through infrared communication or ZigBee. The set-top box performs operation corresponding to the received command (for example, switching channels).

If there is no command corresponding to the dot code, the read dot code is transmitted as is to the network terminal through ZigBee communication.

It should be noted that transmission means for transmitting to the set-top box or network terminal may be Bluetooth or other wireless means in addition to infrared communication and ZigBee communication. Furthermore, the transmission means may be wired means that establishes connection using a connector and the like.

Figure 3:
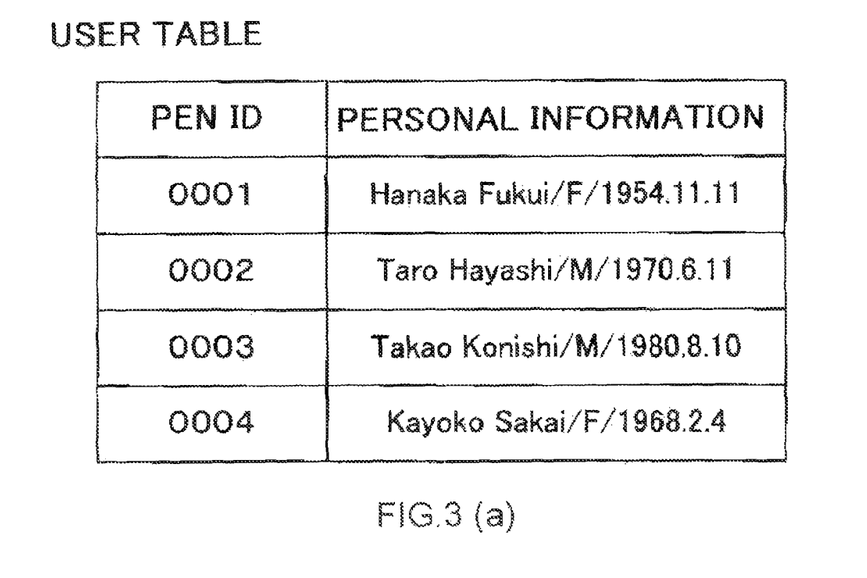
FIGS. 3A and 3B are explanatory diagrams showing server tables that exist in a dot code management server.

The CPU in the network terminal transmits the dot code to a dot code management server. The CPU of the dot code management server refers to the server table (FIG. 3) that is described later, retrieves information corresponding to the dot code, instructs a content distribution server to deliver the information. The content distribution server delivers the information to the set-top box, and the set-top box performs the delivered operation (for example, reproduction of downloaded video data).

Figure 2:
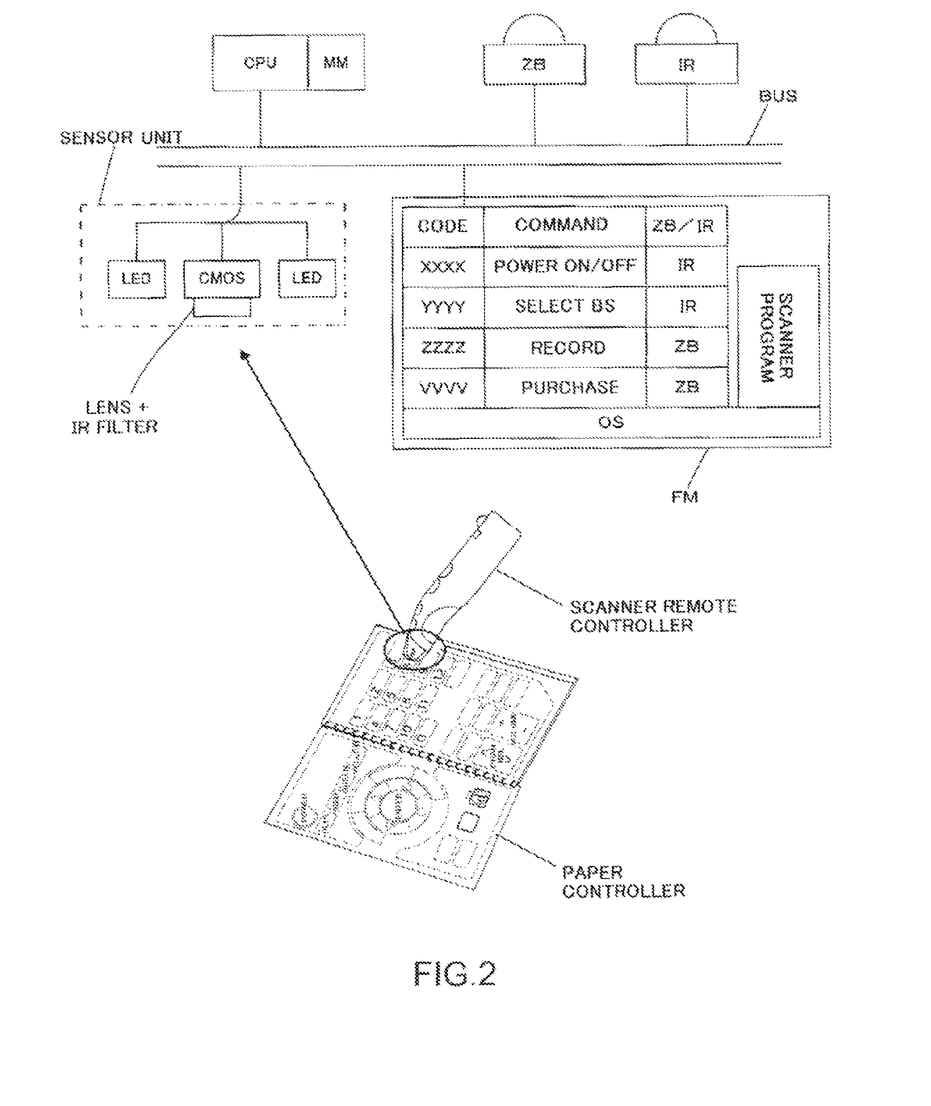
FIG. 2 is a hardware block diagram showing the configuration of the scanner remote controller.

FIG. 2 is a hardware block diagram illustrating the configuration of the above-described scanner remote controller.

As shown in FIG. 2, the scanner remote controller comprises, centering on a central processing unit (CPU), a main memory (MM), and a sensor unit, table, ZigBee communication unit (ZB), and infrared communication unit (UR) that are connected through buses.

The table is registered together with an operating system (OS) in the flash memory (FM).

The table relates codes to commands (for example, selecting a channel) and communication methods (whether a ZigBee method or UR method).

The central processing unit (CPU) sequentially reads out and executes programs in the flash memory through the bus (BUS) and the main memory (MM).

The sensor unit comprises an LED as infrared irradiation means, lens, IR filter, and CMOS sensor (reading element) as optical imaging means. If LED irradiates the printed surface of the paper controller, the CMOS sensor images the reflection. Here, the dot pattern on the paper controller is printed with carbon ink and other part than the dot pattern is printed with non-carbon ink.

Since this carbon ink has a characteristic of absorbing infrared light, the image captured by the optical imaging element shows black only at the dot portion.

Here, the irradiation light is described in a case using a dot pattern printed with carbon ink (ink having a characteristic of absorbing infrared rays) using infrared rays in this embodiment, the characteristics of the irradiation light and ink is not limited to this case, and ultraviolet rays may be utilized and ink having a characteristic of absorbing ultraviolet rays may be used to print a dot pattern.

The captured image of the dot pattern read out in this way is analyzed by the central processing unit (CPU) of the scanner remote controller and converted to a dot code (a coordinate value or code value). If a command corresponding to the dot code exists in the table, the central processing unit transmits the corresponding command to the set-top box by the corresponding communication means (ZigBee method or UR method). Here, if a command corresponding to the dot code does not exist in the table, the dot code is transmitted as is to the dot code management server through the network.

FIGS. 3A and 3B are explanatory diagrams showing the server tables.

These server tables are stored in the dot code management server. FIG. 3A shows a user table and FIG. 3B shows a product table.

The user table of FIG. 3A is a table that relates a pen ID to personal information. The pen ID is an ID for identifying a scanner remote controller, and an unique identification code is added to each scanner remote controller. The CPU of the scanner remote controller transmits a scanner ID when transmitting a dot code to a dot code management server based on the program. The CPU of the dot code management server refers to the user table and retrieves personal information corresponding to the pen ID. Personal information is a variety of information relating to the user of the scanner pen, such as a name, sex, and date of birth.

The product table of FIG. 3B is a table that relates a product ID to product information. The product ID is an ID for identifying a product and included in the received dot code. The CPU of the server refers to the product table and retrieves the product information corresponding to the product ID. Product information is a variety of information relating to the product, such as a cake set, fruit set, and Japanese confectionary set.

FIGS. 4 to 10C describe such a dot pattern.

<Description of Dot Pattern: GRID 1>

FIGS. 4 to 9D are explanatory diagrams showing an example of the dot pattern of the invention, GRID 1.

It should be noted that in FIGS. 4 to 9D, the grid lines in horizontal and vertical directions are added for convenience of explanation, and do not exist in actual printing surfaces. It is preferable that when the scanner as imaging means has an infrared irradiation unit, the dot pattern 1 constituents, such as key dot 2, information dot 3, and reference grid point dot 4, are printed with invisible ink which absorbs the infrared light or with carbon ink.

Figure 4:
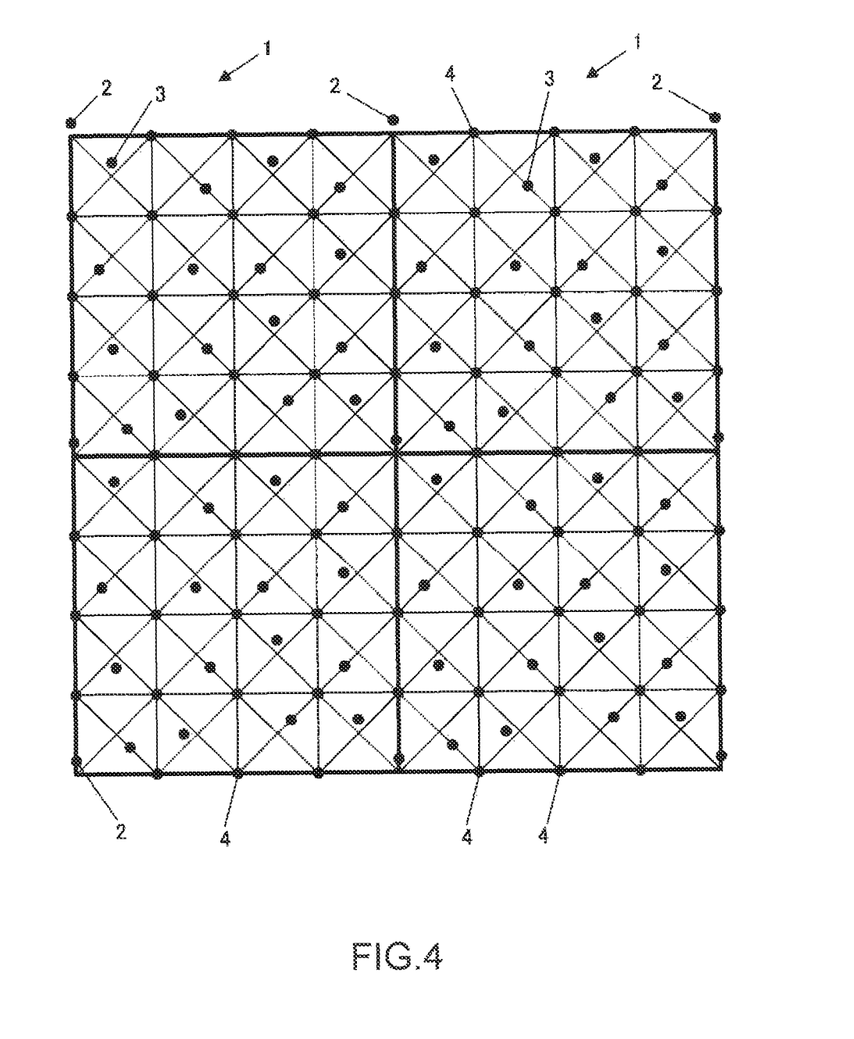
FIG. 4 is an explanatory diagram showing an example of a dot pattern of GRID1.
Figure 5:
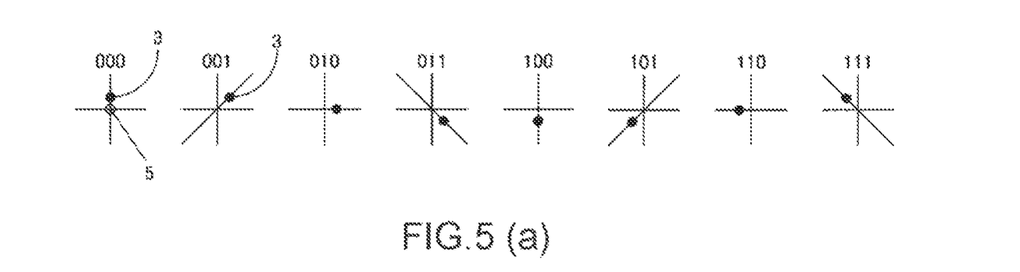
FIGS. 5A and 5B are enlarged diagrams showing examples of information dot in a dot pattern of GRID 1.

FIG. 4 is an enlarged diagram showing an example of information dot of the dot pattern and the bit expression of data defined therein. FIGS. 5A and 5B are explanatory diagrams showing information dots arranged around key dots.

The information input/output method using the dot pattern of the invention comprises a unit for generating dot pattern 1, a unit for recognizing dot pattern 1, and a unit for outputting information and a program from this dot pattern 1. That is, after retrieving dot pattern 1 as image data by a camera, first, the method extracts reference grid point dot 4, next, extracts key dot 2 based on the fact that there is no dot at the location where reference grid point dot 4 is supposed to be, extracts information dot 3, and digitizes information dot 3 to extract the information region and convert the information into numerical values. Based on the numerical information, information and a program are output from this dot pattern 1. For example, information, such as a sound and a program, is output, from this dot pattern 1, to an information output device, personal computer, PDA, mobile telephone, or the like.

To generate dot pattern 1 of the invention, based on a dot code generation algorithm, fine dots used for recognition of numerical information including key dot 2, information dot 3, and reference grid point dot 4 are arranged according to a predetermined rule. As shown in FIGS. 5A and 5B, in a block of dot pattern 1 that represents information, 5×5-reference grid point dots 4 are arranged with reference to key dot 2, and information dot 3 is arranged around virtual grid point 5 which is surrounded by four reference grid point dots 4. Arbitrary numerical information is defined in this block. The example illustrated in FIG. 4 shows four blocks of dot pattern 1 arranged in parallel (in bold frame), provided, however, that dot pattern 1 is not limited to four blocks.

When a camera retrieves this dot pattern 1 as image data, the reference grid point dots 4 can correct a distortion of the lens of the camera, skewed imaging, expansion and contraction of a paper surface, curvature of a medium surface, and distortion during printing. Specifically, a function for calibration (Xn, Yn)=f(Xn', Yn') is calculated to convert distorted four reference grid point dots 4 into the original square, then the vector of correct information dot 3 is obtained by calibrating information dot 3 using the same function.

If reference grid point dots 4 are arranged in dot pattern 1, since the image data of this dot pattern 1 retrieved by the camera is calibrated its distortion attributable to the camera, image data of dot pattern 1 can be recognized accurately even when retrieved by a popular camera with a lens with high distortion rate. Moreover, dot pattern 1 can be accurately recognized even when dot pattern 1 is read by a camera inclined with reference to the surface of dot pattern 1.

Key dots 2 are dots, as shown in FIG. 4, arranged by shifting four reference grid point dots 4 which are disposed at four corners of a block in certain directions. Key dot 2 is a representative point of one block of dot pattern 1 which represents information dot 3. For example, key dots 2 are dots being shifted reference grid point dots 4 disposed at four corners of a block of dot pattern 1 upward by 0.1 mm. However, these numbers are not limited to these, and may vary depending on the size of the block of dot pattern 1.

Information dots 3 are dots used for recognition of a variety of information. Information dot 3 is arranged around key dot 2 as a representative point and also disposed at the ending point of a vector with the starting point of virtual grid point 5 at the center surrounded by four reference grid point dots 4. For example, this information dot 3 is surrounded by four reference grid point dots 4. As shown in FIG. 5A, since dots away from the virtual grid point 5 by 0.1 mm have direction and length as expressed by vectors, the dots can express three bits by being disposed in eight directions by shifting by 45 degrees each in a clockwise direction. Therefore, one block of dot pattern 1 may express 3 bits×16=48 bits.

FIG. 5B is a method of defining information dot 3 having two bits per grid, in the dot pattern of FIG. 4. Two-bit information is each defined by shifting a dot in + direction and × direction. In this way, although 48-bit information can be indeed defined, data may be allocated to each 32 bits by dividing for an intended purpose. Maximum of $2^{16}$ (approx. 65,000) dot pattern formats can be realized depending on the combination of + direction and × direction.

It will be appreciated that the dot pattern format is not limited to this, and may vary including a possibility of four-bit expression by arranging the dots in 16 directions.

The dot diameter of key dot 2, information dot 3, or reference grid point dot 4 is approximately 0.05 mm in consideration of visual quality, printing accuracy in respect of a paper property, resolution of camera, and optimal digitalization.

Moreover, in consideration of information amount required for an imaging area and possible false recognition of dots 2, 3, 4, a distance between reference grid point dots 4 is preferably around 0.5 mm in both vertical and horizontal directions. Displacement of key dot 2 is preferably around 20% the grid distance, taking into account the possible false recognition with reference grid point dot 4 and information dot 3.

A distance between this information dot 3 and a virtual grid point surrounded by four reference grid point dots 4 is preferably the distance of around 15-30% the gap between neighboring virtual grid points 5. If the gap between information dot 3 and virtual grid point 5 is shorter than this distance, the dots are easily recognized as a big cluster, and are ugly as dot pattern 1. On the other hand, if the gap between information dot 3 and virtual grid point 5 is wider than this distance, the judgment of which one of adjacent virtual grid points 5 is the center of the vector of information dot 3 becomes difficult.

Figure 6:
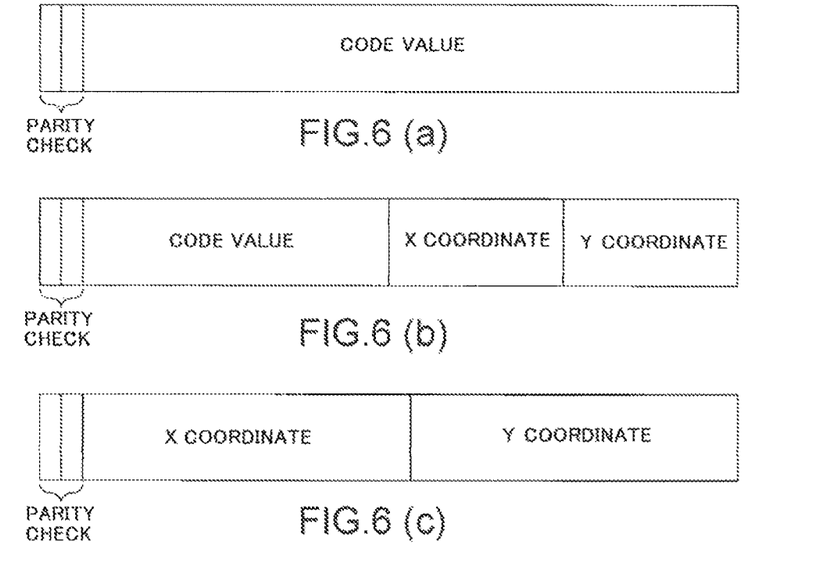
FIGS. 6A to 6C are explanatory diagrams showing dot pattern formats of GRID 1.

As shown in FIG. 4, one dot pattern is a dot pattern comprising 4×4 block regions. Two-bit information dot 3 is arranged in each block. FIGS. 6A to 6C show the dot code formats of this information dot 3.

FIG. 6A is a case in which a dot pattern comprises is configured only by a code value, and a code value and a parity check value are to be registered.

Also, FIG. 6B registers XY coordinates as well as a code value. That is, Y coordinate, X coordinate, code value, and parity check value are respectively registered.

According to this, in this embodiment, the dot pattern can register XY coordinates as well as a code value. In this way, information can be transmitted and delivered in relation to a position; for example, a map video can be delivered, or a paper controller can be used as a tablet.

Further, FIG. 6C is a format that registers only XY coordinates. As XY coordinates are unique per medium, commands can be transmitted by providing a table that relates the coordinate values to the commands.

In this way, the dot pattern of the invention can come in flexible formats, for example, registering only code values, registering a code value and XY coordinates, and registering XY coordinates as well as a coordinate index.

Figure 7:
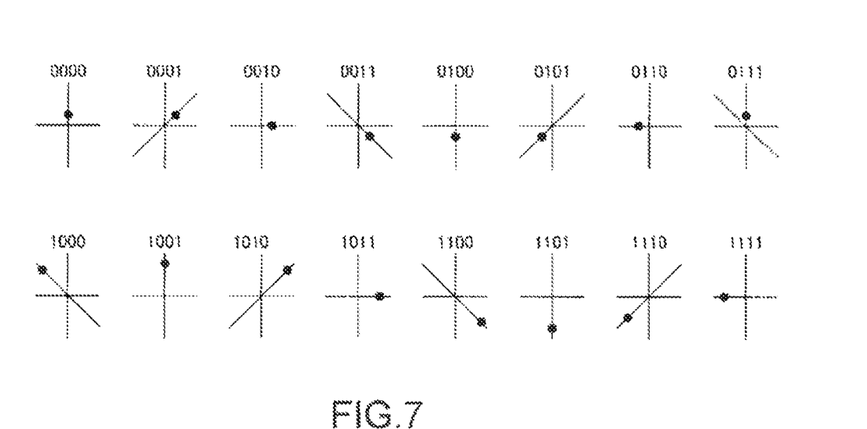
FIG. 7 is an example of information dot of GRID1 and bit expression defined thereby, showing another embodiment.

FIG. 7 is an example of information dot 3 and bit expression of data defined therein, showing another embodiment.

If two types of information dot 3, long and short distances from virtual grid point 5 surrounded by reference grid point dots 4, are used, and vector directions are eight directions, four bits can be expressed. Here, the long distance one of information dot 3 is preferably about 25-30% the gap between neighboring virtual grid points 5. The short distance one of information dot 3 is preferably about 15-20% the gap between neighboring virtual grid points 5. However, a distance between the centers of long and short information dot 3 is preferably longer than the diameter of these dots.

The number of information dot 3 surrounded by four reference grid point dots 4 is preferably one dot, taking into account the visual quality. However, if visual quality is disregarded and information amount should be increased, voluminous information can be included by allocating one bit to one vector and expressing information dot 3 using a plurality of dots. For example, in eight direction concentric vectors, information dot 3 surrounded by four grid dots 4 can express $2^8$ pieces of information, and thus, 16 information dots in one block accounts for $2^{128}$.

Figure 8:
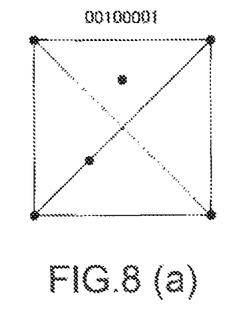
FIG. 8A arranges two dots.
FIG. 8B arranges four dots.
FIG. 8C arranges five dots.
Figure 9:
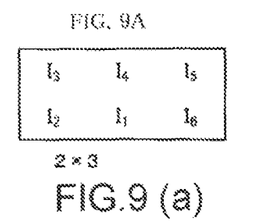
FIG. 9A is a schematic view of six-information dot arrangement.
FIG. 9B is a schematic view of nine-information dot arrangement.
FIG. 9C is a schematic view of 12-information dot arrangement.
FIG. 9D is a schematic view of 36-information dot arrangement.
Figure 10:
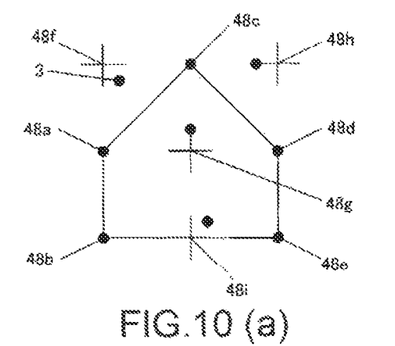
FIGS. 10A to 10C are explanatory diagrams of dot pattern of direction dot.

FIGS. 8A to 8C are examples of information dot and bit expression of data defined therein. FIG. 8A is a diagram of disposing two dots, FIG. 8B is a diagram of disposing four dots, and FIG. 8C is a diagram of disposing five dots.

FIGS. 9A to 9D are varients of the dot pattern. FIG. 9A is a schematic view of six-information dot arrangement, FIG. 9B is a schematic view of nine-information dot arrangement, FIG. 9C is a schematic view of 12-information dot arrangement, and FIG. 9D is a schematic view of 36-information dot arrangement.

Dot pattern 1 shown in FIG. 4 illustrates an example in which 16 information dots 3 (4×4) are arranged in one block. However, this information dot 3 is not limited to 16-dot arrangement, and may vary in many ways. For example, depending on the size of required information amount and the resolution of the camera, six information dots 3 (2×3) may be arranged in one block (FIG. 9A), nine information dots 3 (3×3) may be arranged in one block (FIG. 9B), 12 information dots 3 (3×4) may be arranged in one block (FIG. 9C), or 36 information dots 3 may be arranged in one block (FIG. 9D).

<Description of Dot Pattern; Direction Dot>

Next, another embodiment of the dot pattern, direction dot, is described with reference to FIGS. 10A to 10C.

This dot pattern defines the direction thereof by the shape of the block. Reference points 48a to 48e are first arranged in FIG. 10A. The shape indicating the orientation of the block is defined by lines connecting reference points 48a-48e (in this case, a pentagon facing upward). Then, based on these reference points, virtual reference points 48f, 48g, 48h are arranged, and information dot 3 is arranged at the end point of a vector having a direction and length with this virtual reference point as the starting point. In this way, in FIG. 10A to FIG. 10C, the orientation of the block is defined by the way how reference points are arranged. In addition, the direction dot that defines the orientation of the block also defines the size of the entire block.

It should be noted that, while reference points 48a-48e and information dot 3 are described as being of the same shapes in FIG. 10A, the shapes of reference points 48a-48e may be larger than information dot 3. Further, these reference points 48a-48e and information dot 3 may be of any shape, as long as they are identifiable, including a triangle, rectangle, or other polygons.

In FIG. 10B, information is defined by whether or not there is an information dot on the virtual grid point of a block.

FIG. 10C shows that each two blocks shown in FIG. 10A are connected in parallel in horizontal and vertical directions.

It should be noted that, in addition to the dot patterns generated based on the algorithm as shown in FIGS. 4-10C, there can be any dot patterns including the ones described in Japanese Unexamined Patent Application Publication No. 2003-511761 and Japanese Patent Application Publication No. 2007-288756.

Next, a specific example of purchasing a product using the present system is described.

In this specific example, the paper controller is a mail order catalog that is superimposed and printed with dot patterns. A user clicks a photograph described in the mail order catalog using a scanner remote controller. Then, the CPU of the scanner remote controller converts the dot pattern printed on the clicked photograph into a dot code according to a program and refers to a table registered in FM (flash memory). As there is no command exists corresponding to the dot code, the read dot code is transmitted as is to a network terminal through ZigBee communication.

Figure 11:
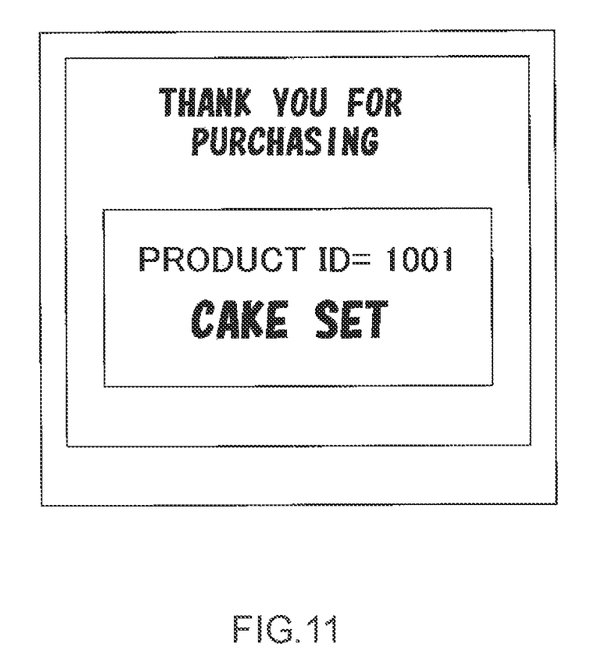
FIG. 11 is a diagram showing an image displayed on a television monitor when the system is used for mail order sales.

The CPU in the network terminal transmits the dot code to the dot code management server. The CPU of the dot code management server refers to the user table shown in FIG. 3A and retrieves personal information corresponding to the received pen ID. The received pen ID is 0002. If the user table is referred to, personal information corresponding to 0002 is "Taro Hayashi, Male, Born in Jun. 11, 1970." Next, the product table shown in FIG. 3B is referred to. The product ID included in the received dot code is 1001. If the product table is referred to, the product information corresponding to 1001 is a cake set. The CPU of the dot code management server instructs the product purchasing server, that is the content distribution server, to process purchasing of product ID "1001" and product information "cake set." The product purchasing server processes purchasing of the cake set and delivers the result to the set-top box. As the result, the set-top box displays "Thank you for purchasing" and "Product ID=1001 Cake set" on the screen of the television monitor as shown in FIG. 11.

Figure 12:
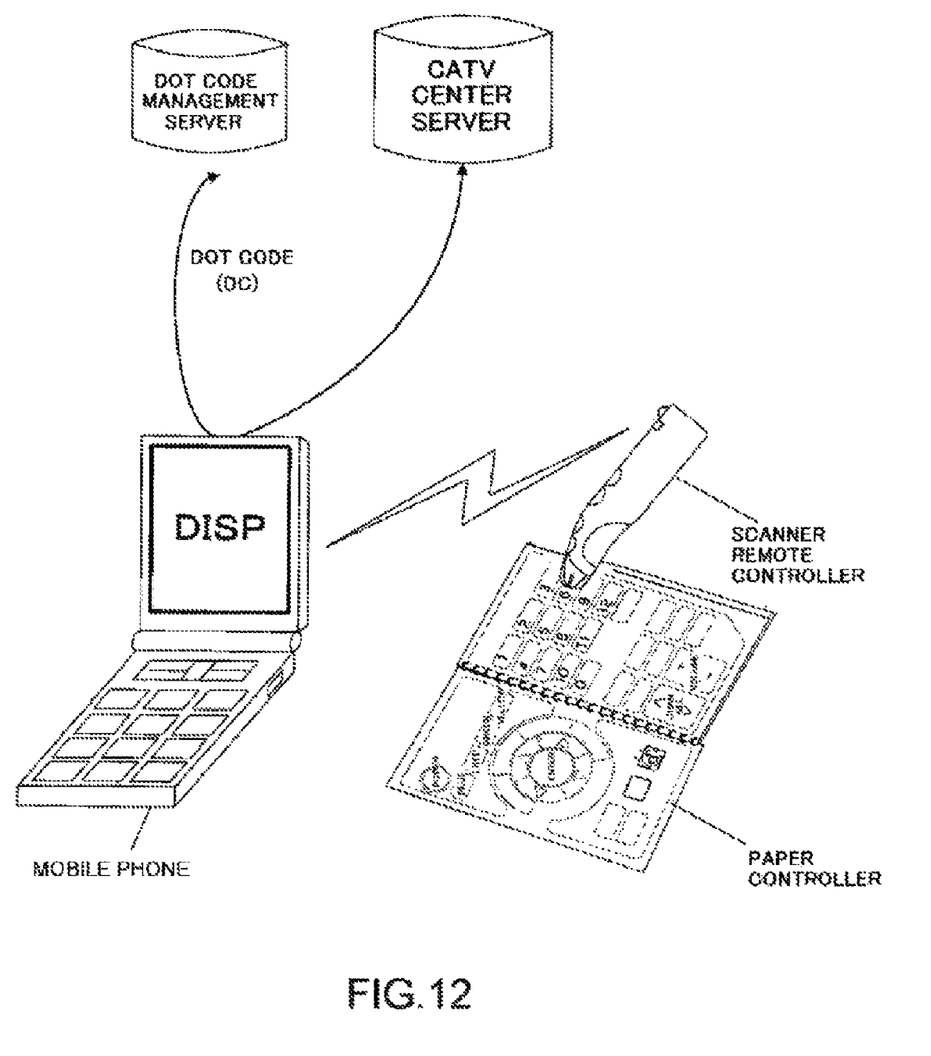
FIG. 12 is an explanatory diagram showing a case in which the second relay device is a mobile telephone in the present system.

FIG. 12 shows an example of using a mobile telephone terminal as the second relay device.

That is, a catalog as a predelivered medium (this may be a television program listing of cable television broadcast) is printed with a photograph of on-demand content or a product photograph together with the above described dot pattern. If the dot pattern is read out by the scanner remote controller, the dot pattern is converted to a code (read code) that the dot pattern signifies, added header information for mobile telephone terminal, and transmitted to the mobile telephone terminal.

In the mobile telephone terminal, an application program such as i-appli (trademark of NTT DOCOMO INC.) is activated in advance and in a state capable of communicating with the scanner remote controller through infrared communication.

When the central processing unit (CPU) of the mobile telephone terminal receives a signal from the scanner remote controller, the CPU transmits the read code by adding the identification number of itself (the mobile telephone terminal) to the VOD server or product purchasing server according to the above-described program.

If the read code is sent to the VOD server, a content corresponding to the read code (e.g., a motion picture, music, still image) is download-delivered to the mobile telephone terminal.

At the same time, the identification number of the mobile telephone terminal is transmitted to the settlement server, and billing process for the download delivery of the content is performed.

It should be noted that the billing process may be any of: prepaid methods using value information preset in the mobile telephone terminal (e.g., so-called Osaihu-Keitai (trademark of NTT DOCOMO INC.), Edy (trademark of Sony Finance International Inc.)); postpaid methods, such as iD (trademark of NTT DOCOMO INC.); and a carrier billing method that charges together with the communication fee of the mobile telephone terminal.

Further, when purchasing a product, the product purchasing server executes a product purchasing process corresponding to the read code as well as instructs the settlement server to perform the billing process similar to the above process.

Also, the second relay device may have a function as a cradle. As the scanner remote controller can stand on this cradle, and the cradle has a charging function, the cradle can function both as the Internet terminal and the charger of the scanner remote controller, providing more convenient system.

Further, the scanner remote controller may be provided with a microphone capable of inputting a sound.

If there are a plurality of relay devices, such as a cable television, mobile telephone terminal, and Internet terminal, when a user inputs which device is desired to be communicated with (e.g., "television," "Internet") through the microphone, the CPU of the scanner remote controller recognizes the voice sound and transmits a dot code or command that has already been read to a relay device corresponding to the sound.

Having such a function, the user can easily select desirable communication means, which enables provision of a more convenient and flexible system.

Figure 13:
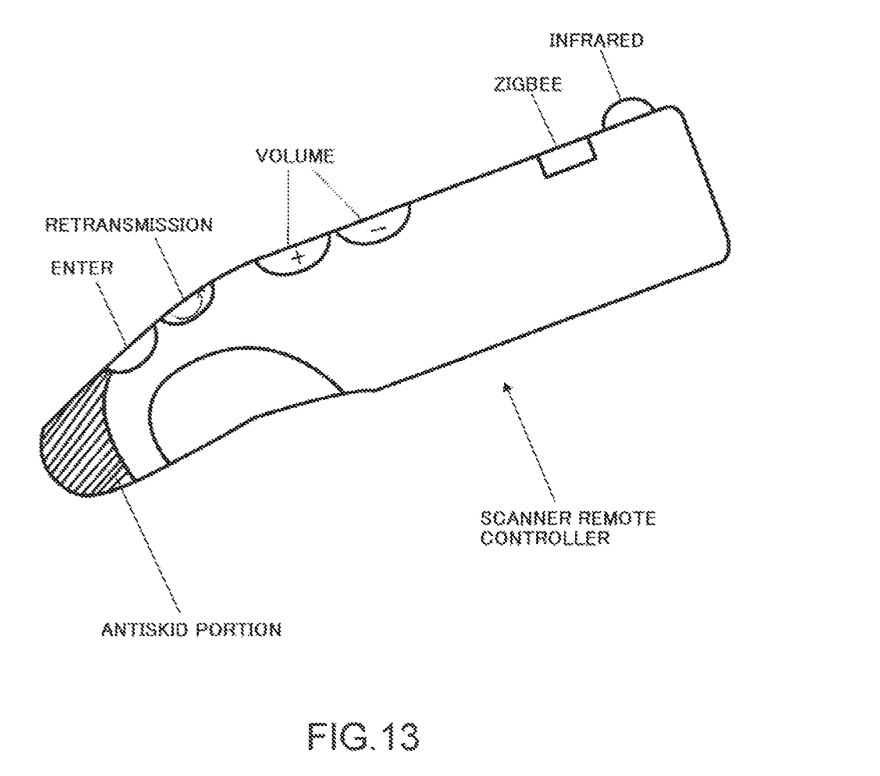
FIG. 13 is an explanatory diagram showing a scanner remote controller provided with a nonskid portion at the leading end.

FIG. 13 is a diagram illustrating a scanner remote controller provided with an antiskid portion at the leading end thereof.

When clicking a paper controller with the scanner remote controller, if friction coefficient between the leading end of the scanner remote controller and the surface of the paper controller is small, there is a problem in which the leading end of the scanner remote controller skids and cannot click the target portion very well (the target dot pattern cannot be accurately read).

Thus, providing the antiskid portion as shown in FIG. 13 at the leading end of the scanner, the target portion (the dot pattern) can be certainly clicked (read).

It should be noted that material used for the antiskid portion may be synthetic rubber, silicone, polyester, acrylic resin, ethylene-vinyl acetate (EVA), or the like.

Figure 14:
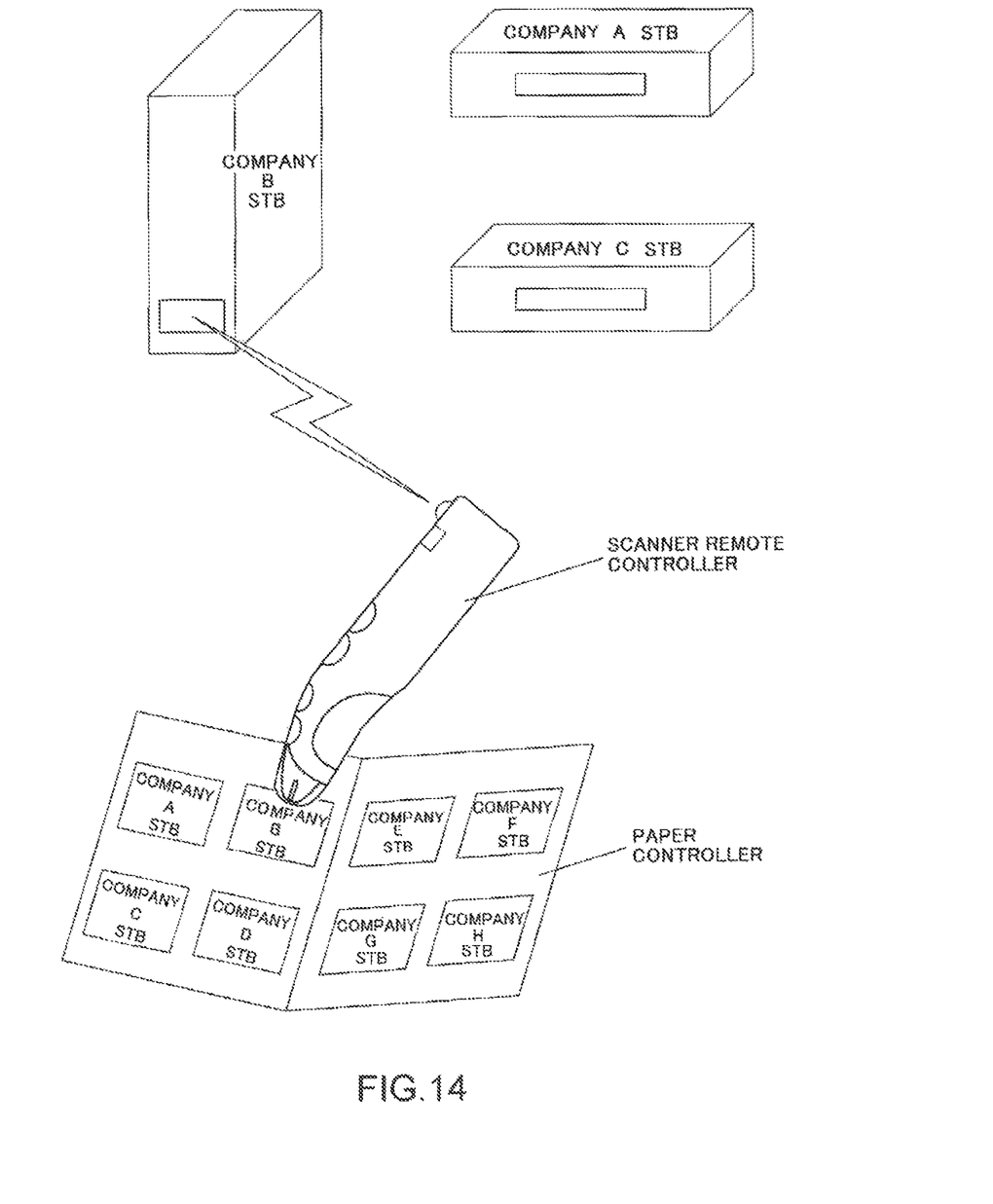
FIG. 14 is an explanatory diagram showing a system in which a dot code and a transmission destination are linked.

FIG. 14 is an explanatory diagram relating to a system in which a dot code and a transmission destination are linked.

The paper controller used in this embodiment is printed with icons indicating company names or instrument names, such as "Company A STB," "Company B STB." This icon is superimposed and printed with a dot pattern including a code value signifying the transmission destination.

For example, if a user touches an icon surface printed as "Company B STB" using the scanner remote controller, the dot pattern superimposed and printed on the icon is read out. The dot pattern includes a code signifying that the transmission destination is the STB (set-top box) of Company B. The CPU of the scanner remote controller transmits the code using infrared rays as carrier wave to the set-top box of Company B. In this way, the scanner remote controller works as if a dedicated remote controller that controls the set-top box of Company B.

Next, the user touches an icon indicating the desired process (for example, viewing of a cable television broadcast) of the paper controller as shown in FIG. 1. Then, the CPU of the scanner remote controller transmits a command corresponding to the dot pattern to the set-top box of Company B. As the result, the set-top box of Company B delivers the program desired by the user.

If a user has a plurality of instruments including a set-top box, there is a problem in which the user has to have a remote controller for each instrument, and control the instrument by finding the remote controller corresponding to the instrument among many remote controllers, requiring time and effort for finding the remote controller. Further, the user has to remember which remote controller is used for which instrument, which places a burden to the user. In this embodiment, it is possible to control a plurality of instruments using one remote controller by linking reading of the dot pattern and a transmission destination before performing a desired operation.

INDUSTRIAL APPLICABILITY

The present invention can be utilized for viewing and listening television programs, reserving recording television programs, mail ordering, and the like, using a set-top box or a mobile telephone.

What is claimed is:
1. A broadcast control system comprising:
a dot code reading device comprising:
an optical reader for optically reading out a dot pattern formed on a medium;
a code converter for converting the dot pattern read out by the reading means to a code;
a table that relates the code to an operation command; and
first and second communication interfaces to output a communication signal converted from the code and the operation command;
a first relay device to receive a communication signal from the first communication interface and control a broadcast receiver; and
a second relay device to receive a communication signal from the second communication interface and transmit to a server connected over a network,
characterized in that
the dot code reading device further comprises:
a transmission controller for, if an operation command corresponding to the read code exists in the table, causing the first communication interface to output a communication signal converted from the corresponding operation command to the first relay device, and if an operation command corresponding to the read code does not exist in the table, causing the second communication interface to output a communication signal converted from the code as is to the second relay device,
wherein the dot code reading device is capable of controlling a plurality of first relay devices, and
wherein on the medium, at least one icon which indicates identification of each first relay device is superimposed and printed with the dot pattern including a code value signifying transmission destination of the corresponding each first relay device which is indicated by the icon to be optically read by the dot code reading device.

2. The broadcast control system according to claim 1, wherein
the first relay device is a broadcast receiving set-top box for controlling receiving of broadcast signals,
the second relay device is a network terminal connected to a network, for receiving a communication signal output from the second communication means and transmitting to the server connected through the network, and
the broadcast receiving set-top box as the first relay device to receive a broadcast signal generated based on the communication signal received by the server and to output video information converted from the broadcast signal to a display device connected to the set-top box.

3. The broadcast control system according to claim 1, wherein the code includes a coordinate value.

4. The broadcast control system according to claim 1, wherein the dot pattern is converted to a unique coordinate value, instead of the code.

5. The broadcast control system according to claim 1, wherein the second relay device, that is, the network terminal device, is a mobile telephone terminal.

6. The broadcast control system according to claim 5, wherein the mobile telephone terminal to transmit a read code obtained by reading a dot pattern formed on a medium of a catalog using the dot code reading device together with an identification code of the mobile telephone terminal to a server.

7. The broadcast control system according to claim 6, wherein the server to execute a process based on the read code in relation to a mobile telephone terminal identified by the identification code as well as to inform the process result to a settlement server.

8. The broadcast control system according to claim 7, wherein the process is download delivery of a content specified by the read code.

9. The broadcast control system according to claim 7, wherein the process is purchase of a product or provision of a service specified by the read code.

10. The broadcast control system according to claim 1, wherein the dot code reading device is a remote controller.

* * * * *